(12) United States Patent
Gainey, Jr. et al.

(10) Patent No.: US 7,961,729 B2
(45) Date of Patent: Jun. 14, 2011

(54) BROADCAST AND MULTICAST PACKET MANAGEMENT

(75) Inventors: Charles W. Gainey, Jr., Poughkeepsie, NY (US); Colin B. Verrilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 476 days.

(21) Appl. No.: 11/621,099

(22) Filed: Jan. 8, 2007

(65) Prior Publication Data

US 2008/0165771 A1 Jul. 10, 2008

(51) Int. Cl.
H04L 12/56 (2006.01)
(52) U.S. Cl. ........................................................ 370/390
(58) Field of Classification Search .................... None
See application file for complete search history.

(56) References Cited

U.S. PATENT DOCUMENTS

| | | | |
|---|---|---|---|
| 6,021,419 A | 2/2000 | Clarke, Jr. et al. | |
| 6,163,812 A | 12/2000 | Gopal et al. | |
| 6,334,154 B1 | 12/2001 | Gloquindo et al. | |
| 6,381,648 B1 | 4/2002 | Broberg, III et al. | |
| 6,681,258 B1 | 1/2004 | Ratcliff et al. | |
| 6,798,788 B1 | 9/2004 | Viswanath et al. | |
| 6,920,153 B2 | 7/2005 | Ellis et al. | |
| 2002/0015406 A1 | 2/2002 | Sun et al. | |
| 2003/0204648 A1 | 10/2003 | Arndt | |
| 2003/0210653 A1 | 11/2003 | Pan | |
| 2004/0196840 A1 | 10/2004 | Amrutur et al. | |
| 2004/0213211 A1 * | 10/2004 | Green | 370/352 |
| 2005/0053060 A1 | 3/2005 | Pettey | |
| 2005/0097051 A1 | 5/2005 | Madill, Jr. et al. | |
| 2005/0097608 A1 | 5/2005 | Penke et al. | |
| 2005/0129040 A1 * | 6/2005 | Kiel et al. | 370/412 |

OTHER PUBLICATIONS

Armstrong et al., "Advanced Virtualization Capabilities of POWER5 Systems", IBM Journal of Research and Development, vol. 49, No. 4/5, p. 523-532, Jul./Sep. 2005.
Loeser et al., "Low-Latency Hard Real-Time Communication over Switched Ethernet", Proceedings: 16$^{th}$ Euromicro Conference on Real-Time Systems, 2004, p. 13-22.
IBM TDB, "LCE Daemon and its Use of Threads to Maintain Connections to Multiple pSeries eServers", IP.com Prior Art Database, Jul. 23, 2001, p. 1249.

* cited by examiner

*Primary Examiner* — Chirag G Shah
*Assistant Examiner* — Yong Zhou
(74) *Attorney, Agent, or Firm* — Yee & Associates, P.C.; Wenjie Li

(57) ABSTRACT

A method, computer program product, and system for managing broadcast packets or multicast packets received by an Ethernet adapter comprising a plurality of logical ports are provided. The method, computer program product, and system provide for a first function operable to register a logical port of the Ethernet adapter as a recipient of any broadcast packet received by the Ethernet adapter satisfying a first predefined criterion and a second function operable to register the logical port of the Ethernet adapter as a recipient of any multicast packet received by the Ethernet adapter satisfying a second predefined criterion, wherein the Ethernet adapter is shared by a plurality of applications executing on a plurality of virtual systems, the first function and the second function being invocable by an application assigned to the logical port.

20 Claims, 4 Drawing Sheets

BROADCAST AND MULTICAST PACKET MANAGEMENT

FIELD OF THE INVENTION

The present invention relates generally to Ethernet adapters. More particularly, the present invention is directed to management of broadcast and multicast packets received by Ethernet adapters.

BACKGROUND OF THE INVENTION

Management of packets is relatively straight forward when only one operating system is involved because the operating system has sole control over an Ethernet adapter by which Ethernet access is accomplished and can establish filtering policies for the Ethernet adapter with respect to broadcast and multicast packets. However, when an Ethernet adapter is shared by multiple operating systems, such as in a computer system that has been partitioned into multiple virtual systems, each with its own operating system image, no single operating system is permitted to establish filtering policies for all other sharing operating systems.

SUMMARY OF THE INVENTION

A method, computer program product, and system for managing broadcast packets or multicast packets received by an Ethernet adapter comprising a plurality of logical ports are provided. The method, computer program product, and system provide for a first function operable to register a logical port of the Ethernet adapter as a recipient of any broadcast packet received by the Ethernet adapter satisfying a first predefined criterion and a second function operable to register the logical port of the Ethernet adapter as a recipient of any multicast packet received by the Ethernet adapter satisfying a second predefined criterion, wherein the Ethernet adapter is shared by a plurality of applications executing on a plurality of virtual systems, the first function and the second function being invocable by an application assigned to the logical port.

DETAILED DESCRIPTION

Figure 1:
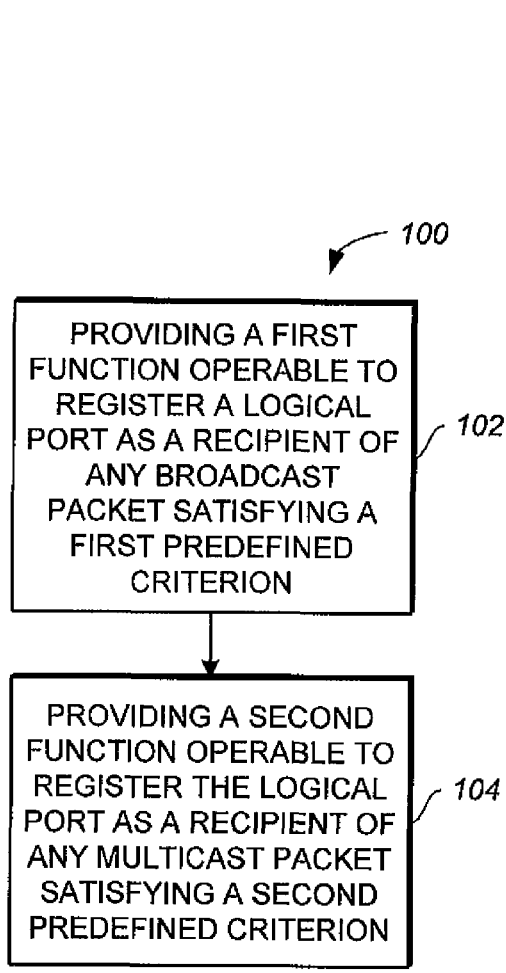
FIG. 1 depicts a process flow of a method for managing broadcast packets or multicast packets received by an Ethernet adapter according to an implementation of the invention.

The present invention relates generally to Ethernet adapters and more particularly to management of broadcast and multicast packets received by Ethernet adapters. The following description is presented to enable one of ordinary skill in the art to make and use the invention and is provided in the context of a patent application and its requirements. The present invention is not intended to be limited to the implementations shown, but is to be accorded the widest scope consistent with the principles and features described herein.

Ethernet adapters enable applications, such as an operating system, to communicate with a network, such as a local area network (LAN). An Ethernet adapter typically includes a physical port which facilitates connection to a network. The Ethernet adapter may include multiple logical ports, which allows multiple applications to share the Ethernet adapter. Each logical port may be identified by a port number and assigned to a specific application, thereby providing accessibility to the physical port and thus to the network.

Applications, such as operating systems, can be executing simultaneously in a virtualized computing environment. In a virtualized computing environment, a single computer system and its various hardware components (e.g., processor, memory, hard disk, etc.) are partitioned into a number of virtual systems. This enables multiple applications to be executing concurrently, e.g., a first application on a first virtual system and a second application on a second virtual system, since each virtual system is allocated a portion of the computer system's resources. Virtualized computer systems usually include a host, sometimes referred to as a hypervisor, which controls allocation of system resources among various virtual systems.

Broadcast (BC) packets are packets addressed to all recipients on a network. Multicast (MC) packets are packets addressed to a specific group of recipients on a network. Under the Ethernet protocol, each packet includes a destination address field. A broadcast packet is typically a packet with all 1's in the destination address field. On the other hand, a multicast packet is usually identified based on whether a particular bit in the destination address field is turned on. In addition, a multicast group is identified by the entire destination address.

When an Ethernet adapter is not shared, i.e., used by a single application, management of broadcast and multicast packets received by the Ethernet adapter is simpler because the single application can establish a broadcast/multicast packet filtering policy for the Ethernet adapter. For example, the single application owning the Ethernet adapter can express filtering policy as "Listen for MC MAC _____" or "Pass/Discard BC". If, however, the Ethernet adapter is shared, i.e., used by multiple applications, management of broadcast and multicast packets received by the Ethernet adapter becomes more difficult since the broadcast/multicast packet filtering policy for the Ethernet adapter cannot be established by any single application as the filtering policy would be applicable to all applications and not all applications may want to receive broadcast packets or multicast packets.

FIG. 1 depicts a process 100 for managing broadcast packets or multicast packets received by an Ethernet adapter according to an implementation of the invention. In the implementation, the Ethernet adapter includes a plurality of logical ports and is shared by a plurality of applications executing on a plurality of virtual systems. At 102, a first function operable to register a logical port of the Ethernet adapter as a recipient of any broadcast packet received by the Ethernet adapter satisfying a first predefined criterion is provided. A second function operable to register the logical port of the Ethernet adapter as a recipient of any multicast packet received by the Ethernet adapter satisfying a second predefined criterion is provided at 104. The first function and the second function are invocable by an application assigned to the logical port. In one implementation, the application is an operating system.

The first predefined criterion is a broadcast packet without a virtual local area network (VLAN) identifier, a broadcast packet with a single VLAN identifier, or a broadcast packet with any VLAN identifier in one implementation. Multiple VLANs are sometimes created within a single physical network to reduce network traffic, to increase network security, to increase control over multiple traffic types, etc.

In one implementation, the second predefined criterion is a multicast packet with any media access control (MAC) address and without a virtual local area network (VLAN) identifier, a multicast packet with any MAC address and with a single VLAN identifier, a multicast packet with any MAC address and with any VLAN identifier, a multicast packet with a single MAC address and without a VLAN identifier, a multicast packet with a single MAC address and with a single VLAN identifier, or a multicast packet with a single MAC address and with any VLAN identifier.

Figure 2:
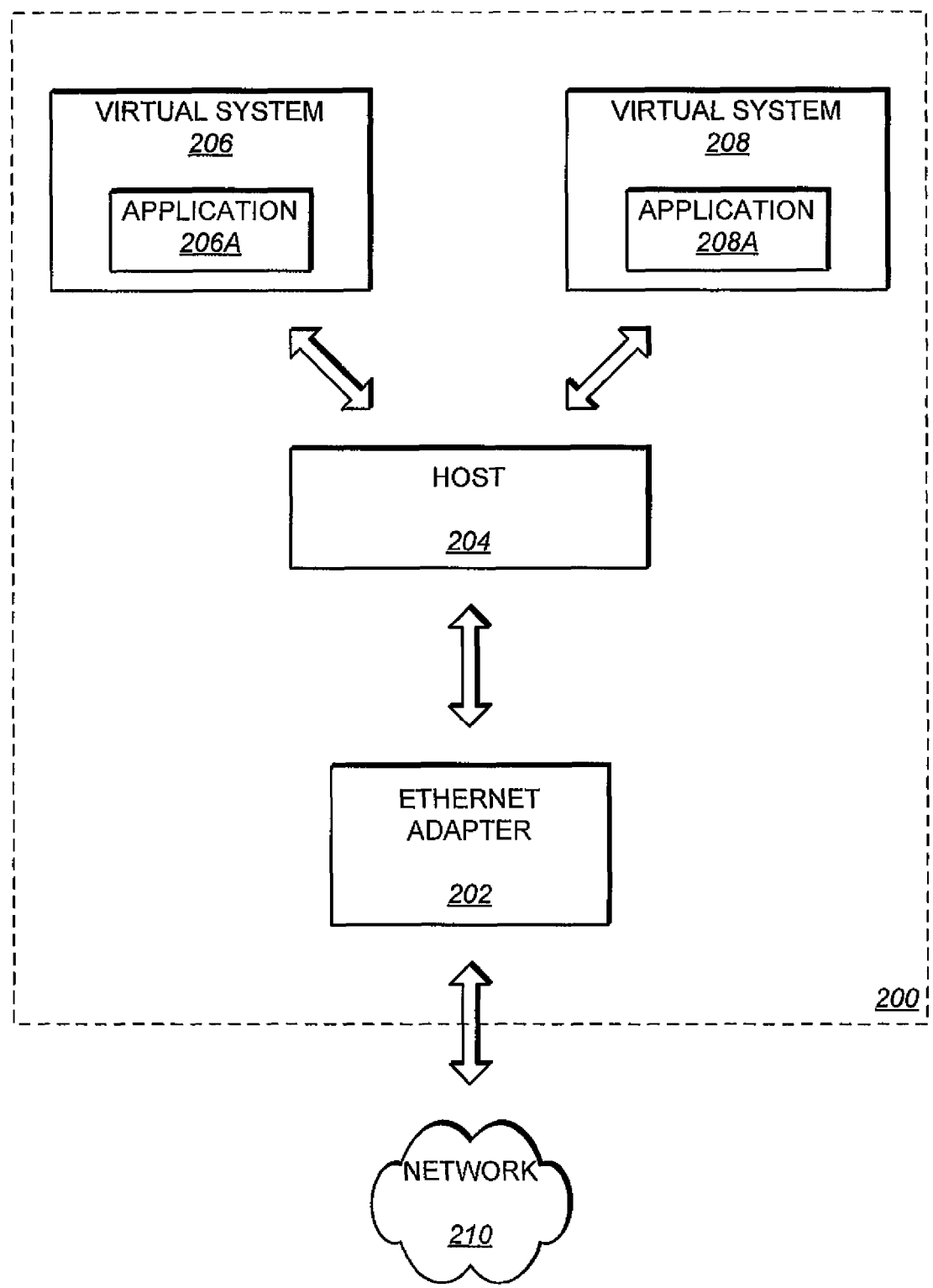
FIG. 2 illustrates a system according to an implementation of the invention.

Shown in FIG. 2 is a system 200 according to an implementation of the invention, System 200 includes an Ethernet adapter 202 in communication with a host 204, which is in communication with an application 206A executing on a virtual system 206 and with an application 208A executing on a virtual system 208. Other applications (not shown) may also be executing on virtual systems 206 and 208.

In the implementation, Ethernet adapter 202 is shared by virtual systems 206 and 208 and any application executing thereon, such as applications 206A and 208A. Ethernet adapter 202 includes a physical port (not shown), which is connected to a network 210, and a plurality of logical ports (not shown). Each of the applications 206A and 208A is assigned at least one of the plurality of logical ports. Applications executing on the same virtual system may share a logical port. In one implementation, host 204 is a hypervisor and applications 206A and 208A are operating systems.

Host 204 includes a first function operable to register a logical port of Ethernet adapter 202 as a recipient of any broadcast packet received by Ethernet adapter 202 satisfying a first predefined criterion and a second function operable to register the logical port of Ethernet adapter 202 as a recipient of any multicast packet received by Ethernet adapter 202 satisfying a second predefined criterion. The first function and the second function are invocable by applications 206A and 208A and may be implemented as hypervisor calls. In one implementation the first function and the second function are combined into one function, e.g., one hypervisor call.

Other components (not shown), such as memory, processor, hard disk, etc., may be included in system 200, which can be utilized in conjunction with Ethernet adapter 202, host 204, virtual systems 206 and 208, and applications 206A and 208A. Additionally, system 200 may include additional Ethernet adapter(s), virtual system(s), and/or application(s). Further, Ethernet adapter 202 may be connected to other network(s) (not shown), In one implementation, information relating to registration of the local port as recipient of broadcast or multicast packets is maintained in one or more tables in a memory (not shown) of system 200.

Figure 3:
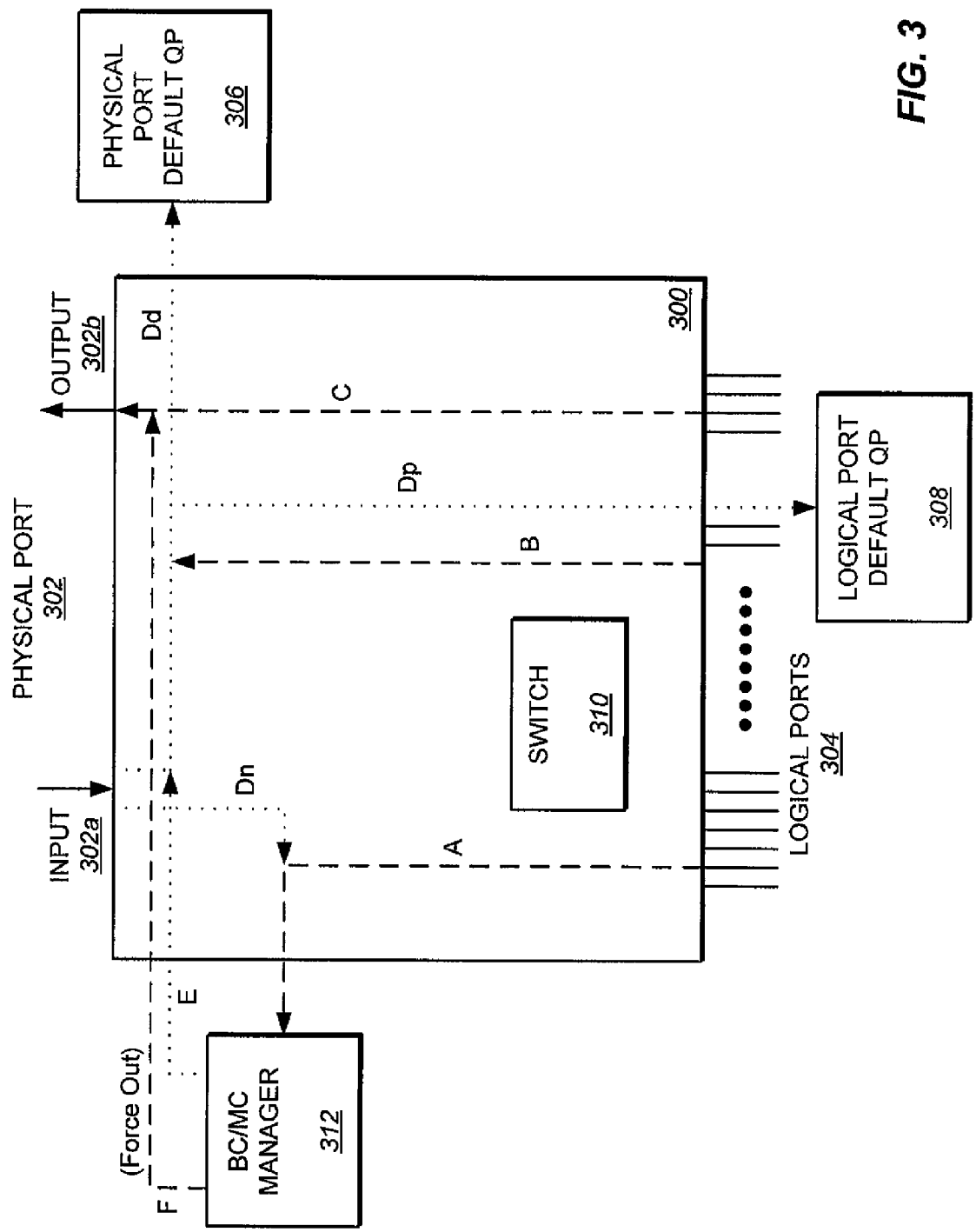
FIG. 3 shows an Ethernet adapter according to an implementation of the invention.

FIG. 3 illustrates an Ethernet adapter 300 according to an implementation of the invention. Ethernet adapter 300 includes a physical port 302, which provides a connection to a network. In addition, Ethernet adapter 300 includes a plurality of logical ports 304. Each logical port 304, which may be identified with a 16-bit port number and assigned to an application (not shown) sharing Ethernet adapter 300, provides accessibility to physical port 302 and thus to the network.

Each port of Ethernet adapter, whether physical or logical, is associated with a default queue pair (QP)—a receive queue and a transmit queue. Portions of system memory (not shown) may be used as queues. The term work queue element (WQE) is sometimes used to refer to an available slot in a queue. A default QP 306 for physical port 302 and a default QP 308 for one of the logical ports 304 are illustrated in FIG. 3. Additional queue pairs (not shown) may be associated with each logical port 304.

A switch 310 is further included in Ethernet adapter 300. Switch 310 embodies logic for routing packets transmitted and received by Ethernet adapter 300. Switch 310 provides port-to-port connectivity between logical ports 304 without necessarily having to transit physical port 302. A transmission of this type is sometimes referred to as a wrap.

In one implementation, a packet, also referred to as a message, is a string of 8-bit bytes, which includes one or more header sections that contain addressing information and other control settings. Addressing information may include MAC address and MAC type, e.g., broadcast (BC), multicast (MC), or unicast (UC). Unicast packets are packets meant for a single destination.

One of the control settings in a packet may be a virtual local area network (VLAN) identifier (ID). In one implementation, a VLAN ID is an integer value in the range of 0-4,095. A VLAN ID may be part of a tag in a header of a packet. The tag may also be used to specify other control settings, such as priority information. A virtual LAN may also have associations where packet destinations are allowed or disallowed, and thus the flow and replication of such a packet is affected.

Also illustrated in FIG. 3 is a broadcast/multicast (BC/MC) manager 312. BC/MC manager 312 handles broadcast and multicast packet registration information of logical ports 304. Since information relating to registration of logical ports 304 as recipients of broadcast and/or multicast packets is stored in one or more tables in the implementation, those tables are managed by BC/MC manager 312. Broadcast and multicast packets received by Ethernet adapter 300 are also routed to BC/MC manager 312, which will determine how the packets should be routed based on registration information. In one implementation, BC/MC manager 312 is part of a host or hypervisor of a computer system in which Ethernet adapter 300 resides.

Various inputs (dotted lines) and outputs (dashed lines) are illustrated in FIG. 3 to represent packets being routed through Ethernet adapter 300. Flow A is a BC/MC output packet from one of the logical ports 304. Flow B is a UC output packet from one of the logical ports 304 that becomes an input packet as if it had been received from physical port 302 (i.e., a wrap). Flow C is a UC output packet from one of the logical ports 304. Flow Dd is a UC input packet received via physical port 302 or came from flow B, whose destination is not determined. Flow Dn is a BC/MC input packet from physical port 302. Flow Dp is a UC input packet received via physical port 302 or came from flow B that is destined for one of the logical ports 304. Flow E is a BC/MC input packet destined for one of the logical ports 304. Flow F is a BC/MC output packet to be outputted by physical port 302.

The inputs and outputs illustrated in FIG. 3 can also be viewed as designating one of the following packets:

A broadcast/multicast (BC/MC) packet that arrived via an input 302a of physical port 302, which then proceeds to BC/MC manager 312 (flow Dn).

A unicast (UC) packet that arrived via physical port input 302a or is a wrap (flow B), which then proceeds to physical port default queue pair (QP) 306 (flow Dd) or logical port default QP 308 (flow Dp).

A BC/MC packet sent by BC/MC manager 312, which proceeds to one of the logical ports 304 (flow E).

A BC/MC packet sent from one of the logical ports 304, which then proceeds to BC/MC manager 312 (flow A).

A BC/MC packet sent by BC/MC manager 312, which then proceeds to an output 302b of physical port 302 (flow F).

A UC packet sent from one of the logical ports 304, which then proceeds to wrap (flow B).

A UC packet sent from one of the logical ports 304, which then proceeds to physical port output 302b (flow C).

In the implementation of FIG. 3, all packets received at physical port 302 are subject to the following:

For a UC packet, a destination MAC (DMAC) lookup is performed to determine a destination logical port. The lookup may involve a search of a set of MAC addresses of logical ports 304 associated with physical port 302. A successful lookup may also determine a destination default QP that corresponds to the destination port and may or may not be superseded by filtering applied in subsequent processing of the packet.

For a BC/MC packet, DMAC lookup is not performed. If a BC/MC packet survives physical port 302 filtering, it is routed to BC/MC manager 312, which has registration information that specifies how the packet is to be processed.

A recirculated BC/MC packet (flow E) is not subject to any functions of switch 310 that might otherwise cause the packet to be discarded. Since the packet is directed to a logical port, it remains subject to filtering controls of the logical port.

Filters may be implemented at physical port 302. BC packets may be subject to the following filters:

BC MAC filtering—All broadcast packets received by physical port 302 are discarded Untagged packet discard—All untagged broadcast packets received by physical port 302 are discarded Tagged packet discard—All tagged broadcast packets received by physical port 302 are discarded Tagged packet filtering—All tagged broadcast packets received by physical port 302 are filtered via a BC-VLAN filter (not shown)

If a BC packet survives filtering placed on physical port 302, a default queue pair (QP) (not shown) of BC/MC manager 312 is valid, and a receive queue (RQ) of the default BC/MC QP has an available work queue element (WQE), the BC packet is placed on the RQ of the default BC/MC QP (flow Dn). Otherwise the BC packet is discarded. If a BC packet is re-circulated by BC/MC manager 312 (flow E), it is tagged to a destination logical port, similar to a DMAC match, and thus becomes subject to additional filtering according to the logical port controls. Such processing is similar to treatment of a UC packet where the destination logical port is determined.

Multicast (MC) packets received at physical port 302 may be subject to the following filters:

MC MAC filtering—All multicast packets received by physical port 302 are filtered based on MAC address, e.g., all packets with a certain MAC address are discarded or all packets with a particular MAC address are passed Untagged packet discard—All untagged multicast packets received by physical port 302 are discarded Tagged packet discard—All tagged multicast packets received by physical port 302 are discarded Tagged packet filtering—All tagged multicast packets received by physical port 302 are filtered via an MC-VLAN filter (not shown)

If an MC packet survives filtering placed on physical port 302, a default queue pair (QP) (not shown) of BC/MC manager 312 is valid, and a receive queue (RQ) of the default BC/MC QP has an available work queue element (WQE), the MC packet is placed on the RQ of the default BC/MC QP (flow Dn). Otherwise the MC packet is discarded. If an MC packet is re-circulated by BC/MC manager 312 (flow E), it is tagged to a destination logical port, similar to a DMAC match, and thus becomes subject to additional filtering according to the logical port controls. Such processing is similar to treatment of a UC packet where the destination logical port is determined.

Unicast (UC) packets received at physical port 302 may be subject to the following filters:

UC MAC filtering with unknown destination port—All unicast packets received by physical port 302 with an unknown destination port are filtered based on MAC address, e.g., all packets with a certain MAC address are discarded or all packets with a particular MAC address are passed Untagged packet with unknown destination port discard—All untagged unicast packets received by physical port 302 with an unknown destination port are discarded Untagged packet with known destination port discard—All untagged unicast packets received by physical port 302 with a known destination port are discarded Tagged packet with unknown destination port discard—All tagged unicast packets received by physical port 302 with an unknown destination port are discarded Tagged packet with known destination port discard—All tagged unicast packets received by physical port 302 with a known destination port are discarded Tagged packet with unknown destination port filtering—All tagged unicast packets received by physical port 302 with an unknown destination port are filtered via a UC-VLAN filter (not shown)

Tagged packet with known destination port filtering—All tagged unicast packets received by physical port 302 with a known destination port are filtered via a VLAN filter of the known destination port If a UC packet with an unknown destination port survives filtering placed on physical port 302, a default unicast (UC) queue pair (QP) (306) of physical port 302 is valid, and a receive queue (RQ) of the default UC QP (306) has an available work queue element (WQE), the UC packet is placed on the RQ of the default UC QP (306). Otherwise the UC packet is discarded. If a UC packet with a known destination logical port survives filtering placed on physical port 302, a default logical port queue pair (QP) of the known destination logical port is valid, for example, default logical port QP (308), and a receive queue (RQ) of the default logical port QP has an available work queue element (WQE), the UC packet is placed on the RQ of the default logical port QP. Otherwise the UC packet is discarded.

Although flow B in FIG. 3 is a wrap, it still represents a packet outputted from one of the logical ports 304. Therefore, receipt of the packet at a wrapped-to destination is subject to the same logical port filtering as if the packet had arrived from physical port 302.

Figure 4:
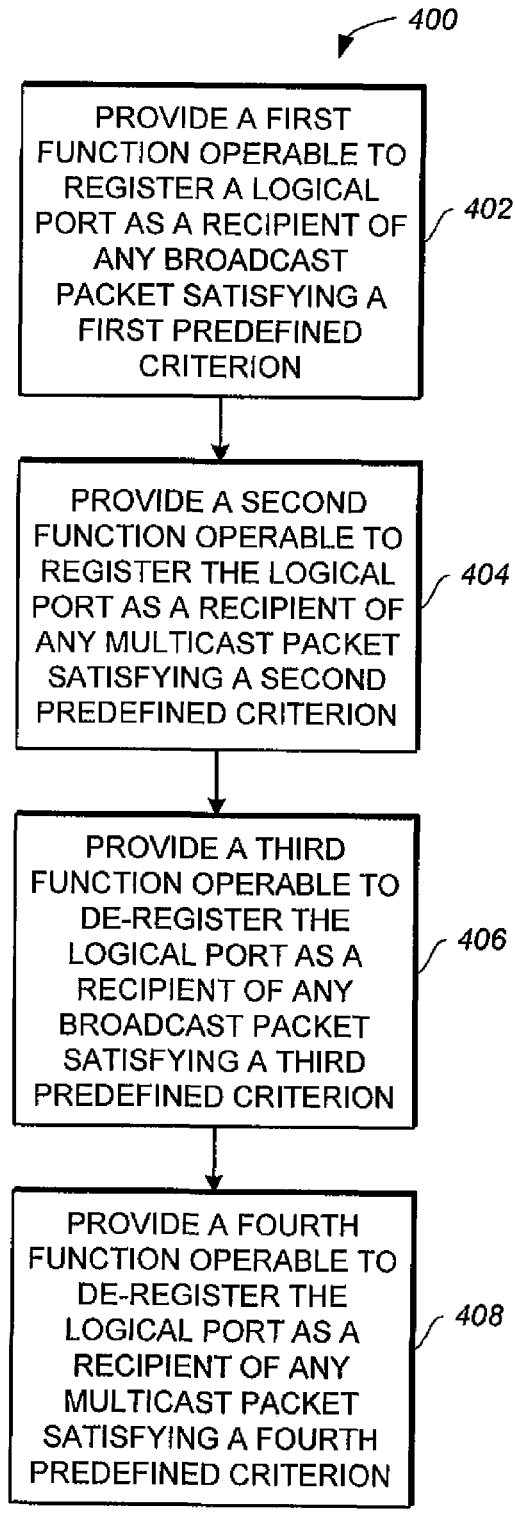
FIG. 4 is a process flow of a method for managing broadcast packets or multicast packets received by an Ethernet adapter according to an implementation of the invention.

Depicted in FIG. 4 is a process 400 for managing broadcast packets or multicast packets received by an Ethernet adapter that includes a plurality of logical ports according to an implementation of the invention. A first function operable to register a logical port of the Ethernet adapter as a recipient of any broadcast packet received by the Ethernet adapter satisfying a first predefined criterion is provided at 402. At 404, a second function operable to register the logical port of the Ethernet adapter as a recipient of any multicast packet received by the Ethernet adapter satisfying a second predefined criterion is provided.

A third function operable to de-register the logical port of the Ethernet adapter as a recipient of any broadcast packet received by the Ethernet adapter satisfying a third predefined criterion is provided at 406. At 408, a fourth function operable to de-register the logical port of the Ethernet adapter as a recipient of any multicast packet received by the Ethernet adapter satisfying a fourth criterion is provided. In the implementation, the Ethernet adapter is shared by a plurality of applications and the first, second, third, and fourth functions are invocable by an application assigned to the logical port.

The first, second, third, and fourth functions may be implemented as hypervisor calls. Additionally, the first function and the second function may be combined into one function. The third function and the fourth function can also be implemented as a single function. In one implementation, the third predefined criterion matches the first predefined criterion. The fourth criterion matches the second criterion in another implementation of the invention.

Below is a sample hypervisor call "H_REG_BCMC" that can be used to register a logical port for broadcast or multicast packets.

```
uint 64                         /*H_Success: Successful completion*/
                                /*H_Adapter_Parm: Invalid adapter handle*/
                                /*H_Port_Parm: Invalid port*/
                                /*H_Not_Enough_Resources: Insufficient resources*/
                                /*H_Rh_Parm: Invalid resource handle*/
                                /*H_R_State: Invalid resource state*/
                                /*H_Mcg_Parm: Invalid multicast group*/
                                /*H_Mcg_Full: Multicast registration exceeded*/
                                /*H_Invalid_Registration: Invalid registration type*/
                                /*H_Hardware: Adapter not operational*/
hcall (const uint32 H_REG_BCMC, /*Function called*/
    uint64 Adapter Handle,      /*Specifies adapter identifier*/
    uint16 Port Number,         /*Specifies logical port identifier*/
    uint4 Reg Type,             /*Specifies registration type*/
    uint48 Multicast MAC,       /*Specifies MAC address*/
    uint12 VLAN ID)             /*Specifies VLAN identifier*/
```

When the "H_REG_BCMC" function is invoked to register a logical port as a recipient of multicast packet(s), the function adds the specified MAC address to a multicast MAC table for the logical port in one implementation. Any multicast packet received that matches a MAC entry in the multicast MAC table is queued to a receive queue of a default queue pair (QP) of the logical port, such as logical port default QP 308. With broadcast packets, once the "H_REG_BCMC" function is invoked by an application assigned to a logical port, the function registers the logical port as a recipient of broadcast packets. For both broadcast and multicast packets, VLAN specifications can be made so that the registration applies only to packets that are tagged with a specified VLAN ID(s), only untagged packets, or both.

A return code for "H_REG_BCMC" is a 64-bit unsigned binary integer, which will report one of the following conditions:

Successful completion
Invalid adapter handle
Invalid port
Insufficient resources
Invalid resource state
Multicast registrations exceeded
Invalid registration type
Adapter not operational The "H_REG_BCMC" hypervisor call includes five parameters. The "Adapter Handle" parameter is a 64-bit unsigned binary integer that identifies an Ethernet adapter. If the specified adapter handle is not valid, the function fails and the return code is set to the "invalid adapter handle" condition. The "Port Number" parameter is a 16-bit unsigned binary integer in the range of 1-65,535 that identifies a logical port within the specified Ethernet adapter. If the specified port is not valid, the function fails and the return code is set to the "invalid port" condition. The "VLAN ID" parameter is a 12-bit unsigned binary integer that specifies a virtual local area network (VLAN) whose multicast/broadcast traffic is a receive candidate. The "Reg Type" parameter is a 4-bit unsigned binary integer that specifies the registration type as one of the following:

0b0000—BC, tagged, single VLAN ID
0b0001—BC, tagged, all VLAN IDs
0b0010—BC, untagged
0b0011—Reserved
0b0100—MC, tagged, single VLAN ID
0b0101—MC, tagged, all VLAN IDs
0b0110—MC, untagged
0b0111—Reserved
0b10xx—Reserved
0b1100—All MC addresses, tagged, single VLAN ID
0b1101—All MC addresses, tagged, all VLAN IDs
0b1110—All MC addresses, untagged
0b1111—Reserved The "Multicast MAC" parameter is a 48-bit unsigned binary integer that specifies a destination multicast MAC address. The parameter is ignored if the registration type is for broadcast packets. Below is a table listing the parameters of the "H_REG_BCMC" function.

| Parameters | Size (Bits) |
| --- | --- |
| Adapter Handle (R4) | 64 |
| Port Number (R5: $b_{48}$-$b_{63}$) | 16 |
| Reg Type (R6: $b_{60\text{-}63}$) | 4 |
| Scope (Single: S = 0, All: S = 1) (R6: $b_{60}$) | 1 |
| MC or BC (M = 0 = BC, M = 1 = MC) (R6: $b_{61}$) | 1 |
| Untagged (U = 0 = Tagged, U = 1 = Untagged) (R6: $b_{62}$) | 1 |
| VLAN Specifications (V = 0 = single, V = 1 = all) (R6: $b_{63}$) | 1 |
| Multicast MAC (R7: $b_{16}$-$b_{63}$) | 48 |
| VLAN ID (R8: $b_{52}$-$b_{63}$) | 12 |

If a reserved registration type is specified, the function fails and the return code is set to the "invalid registration type" condition. The number of registrations of type <BC and MC, tagged, single VLAN ID> may be limited to a preset maximum. For any otherwise valid registration, if internal resources are insufficient to accept the request, the return code is set to the "insufficient resources" condition without further processing. The following table defines additional error conditions and processing for the registration types.

| Registration Type (S.M.U.V) | Existing Conditions Precluding Successful Execution | MAC Parm Used | VLAN-ID Parm Used | Registration Scope Against Specified Port Determined by Type[Parameters] |
|---|---|---|---|---|
| 0b0000 | 1. BC registered for this VID 2. BC registered for all VIDs | No | Yes | BC[VID] |
| 0b0001 | 1. BC registered for one or more or all VIDs | No | No | BC[All VIDs] |
| 0b0010 | 1. BC registered for untagged | No | No | BC[Untagged] |
| 0b0011 | Reserved | N/A | N/A | N/A |
| 0b0100 | 1. MC MAC registered for this VID 2. MC MAC registered for all VIDs | Yes | Yes | MC[MAC & VID] |
| 0b0101 | 1. MC MAC registered for one or more or all VIDs | Yes | No | MC[MAC & All VIDs] |
| 0b0110 | 1. MC MAC registered for untagged | Yes | No | MC[MAC & Untagged] |
| 0b0111-0b1011 | Reserved | N/A | N/A | N/A |
| 0b1100 | 1. Any or all MC MACs registered for this VID 2. Any or all MC MACs registered for all VIDs | No | Yes | MC[All MACs & VID] |
| 0b1101 | 1. Any or all MC MACs registered for one or more or all VIDs | No | No | MC[All MACs & All VIDs] |
| 0b1110 | 1. Any or all MC MACs registered for untagged | No | No | MC[All MACs & Untagged] |
| 0b1111 | Reserved | N/A | N/A | N/A |

If no VLAN-ID processing is specified (U=1), VLAN filtering remains unchanged. Similarly, if tagged processing is specified (U=0), untagged filtering remains unchanged. In one implementation, if a VLAN ID is specified (U=0, V=0), the specified VLAN ID is added to a multicast VLAN-ID table of a specified port, or if all VLAN IDs are specified (U=0, V=1), all VLAN IDs (0-4,095) are added to the multicast VLAN-ID table of the specified port. If an existing condition precluding successful execution is detected, the return code is set to the "invalid resource state" condition without further processing.

A MAC can be registered for one or more VLAN IDs and need not be registered for all VLAN IDs. In order to enable packet receipt, each VLAN ID for which the broadcast or multicast MAC address is registered must also be enabled in the port VLAN filter.

Below is a sample hypervisor call "H_DEREG_BCMC" that can be used to de-register a logical port as a recipient for broadcast and/or multicast packets.

applies only to registrations that are tagged with specified VLAN ID(s), only untagged packets, or both.

A return code for the "H_DEREG_BCMC" function is a 64-bit unsigned binary integer, which can be set to one of the following conditions:
  Successful completion
  Invalid adapter handle
  Invalid port
  Invalid resource state
  Adapter not operational "H_DEREG_BCMC", similar to "H_REG_BCMC", includes five parameters. The "Adapter Handle" parameter is a 64-bit unsigned binary integer that identifies an Ethernet adapter. If the specified adapter handle is not valid, the function fails and the return code is set to the "invalid adapter handle" condition. The "Port Number" parameter is a 16-bit unsigned binary integer in the range of 1-65,535 that identifies a logical port within the specified Ethernet adapter. If the specified port is not valid, the function fails and the return

```
uint 64                         /*H_Success: Successful completion*/
                                /*H_Adapter_Parm: Invalid adapter handle*/
                                /*H_Port_Parm: Invalid port*/
                                /*H_R_State: Invalid resource state*/
                                /*H_Hardware:HEA not operational*/
hcall (const uint32 H_DEREG_BCMC,   /*Function called*/
    uint64 Adapter Handle,          /*Specifies adapter identifier*/
    uint16 Port Number,             /*Specifies logical port identifier*/
    uint4 DeReg Type,               /*Specifies de-registration type*/
    uint48 Multicast MAC,           /*Specifies MAC address*/
    uint12 VLAN ID)                 /*Specifies VLAN identifier*/
```

When the "H_DEREG_BCMC" function is invoked to de-register a logical port as a recipient of multicast packet(s), the function removes the specified MAC address from a multicast MAC table of the logical port in one implementation. With broadcast packets, once the "H_DEREG_BCMC" function is invoked by an application assigned to a logical port, the function de-registers the logical port as a recipient of broadcast packets. For both broadcast and multicast packets, VLAN specifications can be made so that the de-registration code is set to the "invalid port" condition. The "VLAN ID" parameter is a 12-bit unsigned binary integer that specifies a virtual local area network (VLAN) whose multicast broadcast traffic is to be removed as a receive candidate. The "DeReg Type" parameter is a 4-bit unsigned binary integer that specifies the de-registration type as one of the following:
  0b0000—BC, tagged, single VLAN ID
  0b0001—BC, tagged, all VLAN IDs
  0b0010—BC, untagged 0b0011—Reserved
0b0100—MC, tagged, single VLAN ID
0b0110—MC, tagged, all VLAN IDs
0b0110—MC, untagged execution is detected, the return code is set to the "invalid resource state" condition without further processing. The following table defines additional error conditions and processing for the de-registration types.

| Registration Type (S.M.U.V) | Existing Conditions Precluding Successful Execution | MAC Parm Used | VLAN-ID Parm Used | Registration Scope Against Specified Port Determined by Type[Parameters] |
|---|---|---|---|---|
| 0b0000 | 1. BC not registered for this VID<br>2. BC registered for all VIDs | No | Yes | BC[VID] |
| 0b0001 | 1. BC registered for one or more but not all VIDs | No | No | BC[All VIDs] |
| 0b0010 | 1. BC not registered for untagged | No | No | BC[Untagged] |
| 0b0011 | Reserved | N/A | N/A | N/A |
| 0b0100 | 1. MC MAC not registered for this VID<br>2. MC MAC registered for all VIDs | Yes | Yes | MC[MAC & VID] |
| 0b0101 | 1. MC MAC registered for fewer than all VIDs | Yes | No | MC[MAC & All VIDs] |
| 0b0110 | 1. MC MAC not registered for untagged | Yes | No | MC[MAC & Untagged] |
| 0b0111-0b1011 | Reserved | N/A | N/A | N/A |
| 0b1100 | 1. Few than all MC MACs registered for this VID<br>2. All MC MACs registered for one or more VIDs other than this VID<br>3. All MC MACs registered for all VIDs | No | Yes | MC[All MACs & VID] |
| 0b1101 | 1. Fewer than all MC MACs registered for fewer than all VIDs<br>2. All MC MACs registered for fewer than all VIDs<br>3. Fewer than all MC MACs registered for all VIDs | No | No | MC[All MACs & All VIDs] |
| 0b1110 | 1. Fewer than all MC MACs registered for untagged | No | No | MC[All MACs & Untagged] |
| 0b1111 | Reserved | N/A | N/A | N/A |

0b0111—Reserved
0b10xx—Reserved
0b1100—All MC addresses, tagged, single VLAN ID
0b1101—All MC addresses, tagged, all VLAN IDs
0b1110—All MC addresses, untagged
0b1111—Reserved The "Multicast MAC" parameter is a 48-bit unsigned binary integer that specifies a destination multicast MAC address. The parameter is ignored if the de-registration type is for broadcast packets. Below is a table listing the parameters of the "H_DEREG_BCMC" function.

| Parameters | Size (Bits) |
|---|---|
| Adapter Handle (R4) | 64 |
| Port Number (R5: $b_{48}$-$b_{63}$) | 16 |
| DeReg Type (R6: $b_{60-63}$) | 4 |
| Scope (Single: S = 0, All: S = 1) (R6: $b_{60}$) | 1 |
| MC or BC (M = 0 = BC, M = 1 = MC) (R6: $b_{61}$) | 1 |
| Untagged (U = 0 = Tagged, U = 1 = Untagged) (R6: $b_{62}$) | 1 |
| VLAN Specifications (V = 0 = single, V = 1 = all) (R6: $b_{63}$) | 1 |
| Multicast MAC (R7: $b_{16}$-$b_{63}$) | 48 |
| VLAN ID (R8: $b_{52}$-$b_{63}$) | 12 |

If a reserved de-registration type is specified, the function fails and the return code is set to the "invalid registration type" condition. If an existing condition precluding successful A successful de-registration alters the port controls to block each packet based on the parameters and scope of parameters de-registered. In one implementation, if a VLAN ID is specified (U=0, V=0), the specified VLAN ID is removed from a designated BC or MC table entries of a specified port or if all VLAN IDs are specified (U=0, V=1), all VLAN IDs (0-4,095) are removed from the designated BC or MC table entries of the specified port. The de-registration of the specified type using the parameters as previously described is performed against the port specified.

By providing functions that can be invoked by an application sharing an Ethernet adapter to register or de-register a logical port of the Ethernet adapter assigned to the application as a recipient of broadcast and/or multicast packets, each application sharing the Ethernet adapter is able to set its own filtering policies without affecting other applications sharing the Ethernet adapter. In addition, the functions permit applications sharing the Ethernet adapter to create individualized VLAN filtering policies. Further, since execution of filtering policies in a shared Ethernet adapter environment has become a job of the shared Ethernet adapter, i.e., has been removed from each application sharing the Ethernet adapter, the provided functions allow the applications to give input on customization of filtering policies.

The invention can take the form of an entirely hardware implementation, an entirely software implementation, or an implementation containing both hardware and software elements. In one aspect, the invention is implemented in software, which includes, but is not limited to, firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include DVD, compact disk—read-only memory (CD-ROM), and compact disk—read/write (CD-R/W).

Figure 5:
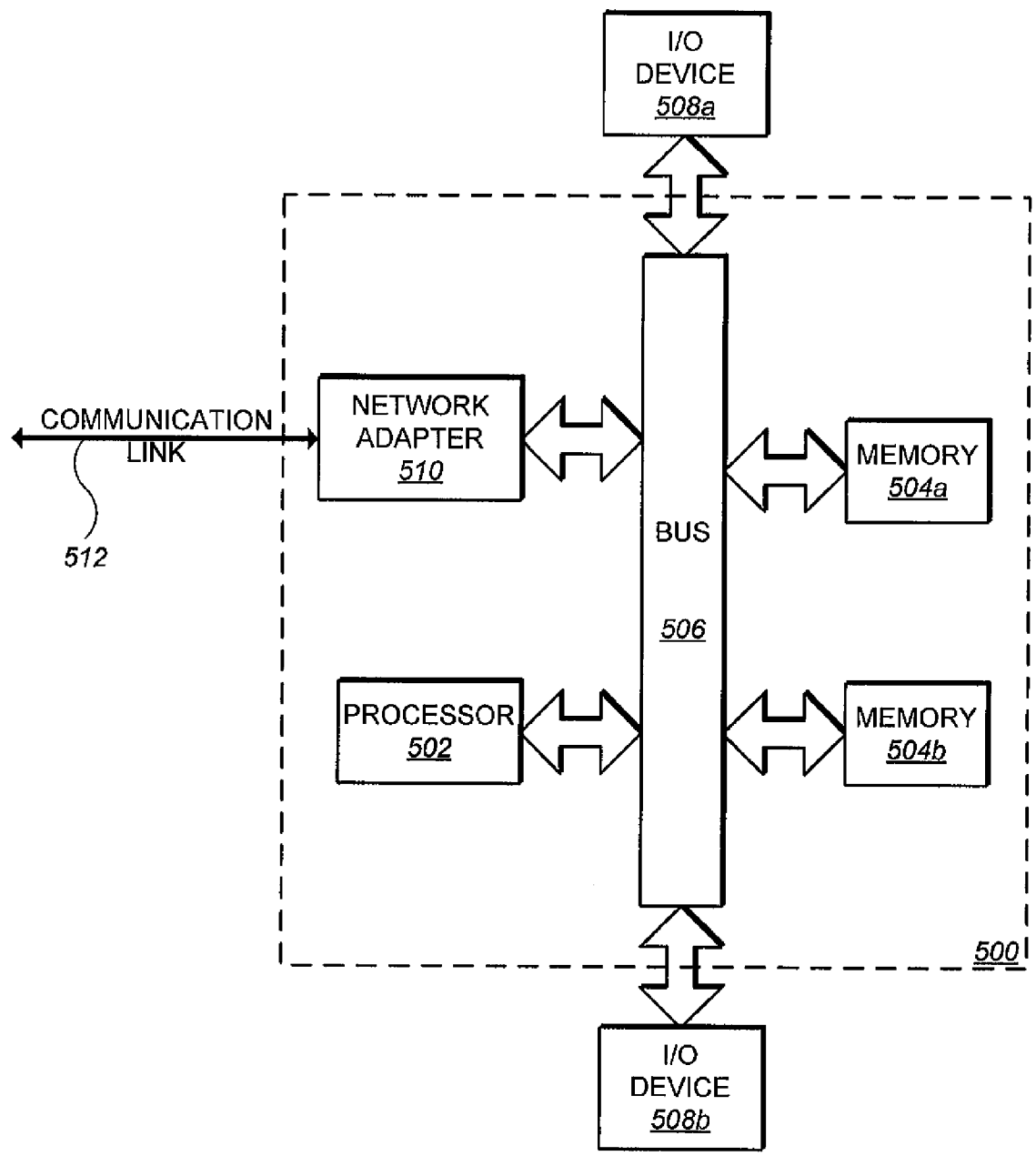
FIG. 5 depicts a block diagram of a data processing system with which implementations of the invention can be implemented.

Shown in FIG. 5 is a data processing system 500 suitable for storing and/or executing program code. Data processing system 500 includes a processor 502 coupled to memory elements 504a-b through a system bus 506. In other implementations, data processing system 500 may include more than one processor and each processor may be coupled directly or indirectly to one or more memory elements through a system bus.

Memory elements 504a-b can include local memory employed during actual execution of the program code, bulk storage, and cache memories that provide temporary storage of at least some program code in order to reduce the number of times the code must be retrieved from bulk storage during execution. As shown, input/output or I/O devices 508a-b (including, but not limited to, keyboards, displays, pointing devices, etc.) are coupled to data processing system 500. I/O devices 508a-b may be coupled to data processing system 500 directly or indirectly through intervening I/O controllers (not shown).

In the implementation, a network adapter 510 is coupled to data processing system 500 to enable data processing system 500 to become coupled to other data processing systems or remote printers or storage devices through communication link 512. Communication link 512 can be a private or public network. Modems, cable modems, and Ethernet cards are just a few of the currently available types of network adapters.

While various implementations for managing broadcast and multicast packets received by Ethernet adapters have been described, the technical scope of the present invention is not limited thereto. Various modifications or improvements can be added to the above implementations and those modifications or improvements fall within the technical scope of the present invention

What is claimed is:

1. A method for managing broadcast packets or multicast packets received by an Ethernet adapter comprising a plurality of logical ports, wherein the Ethernet adapter is shared by a plurality of applications executing on a plurality of virtual systems, the method comprising:

providing a first function operable to register a logical port of the Ethernet adapter as a recipient of any broadcast packet received by the Ethernet adapter satisfying a first predefined criterion, including a broadcast packet with or without a virtual local area network (VLAN) identifier;

providing a second function operable to register the logical port of the Ethernet adapter as a recipient of any multicast packet received by the Ethernet adapter satisfying a second predefined criterion, including a multicast packet with a media access control (MAC) address and with or without a VLAN identifier;

invoking the first function by an application assigned to the logical port, including providing a first registration type, a port number and a VLAN identifier parameters by the application, wherein the first registration type parameter indicates the broadcast packet with or without a VLAN identifier, the VLAN identifier parameter identifies a VLAN whose broadcast traffic is a receive candidate, and the port number parameter identifies a logical port within the Ethernet adapter, and wherein invoking the first function results in registration of only the logical port assigned to the application invoking the first function as a recipient of any broadcast packet received by the Ethernet adapter satisfying the first predefined criterion; and invoking the second function by the application assigned to the logical port, including providing a second registration type, a port number, a MAC address and a VLAN identifier parameters by the application, wherein the second registration type parameter indicates the multicast packet with or without a VLAN identifier, the VLAN identifier parameter identifies a VLAN whose multicast traffic is a receive candidate, the port number parameter identifies a logical port within the Ethernet adapter, and the multicast MAC address parameter specifies a destination multicast address, and wherein invoking the second function results in registration of only the logical port assigned to the application invoking the second function as a recipient of any multicast packet received by the Ethernet adapter satisfying the second predefined criterion.

2. The method of claim 1, wherein the first predefined criterion is a broadcast packet without a virtual local area network (VLAN) identifier, a broadcast packet with a single VLAN identifier, or a broadcast packet with any VLAN identifier.

3. The method of claim 1, wherein the second predefined criterion is a multicast packet with any media access control (MAC) address and without a virtual local area network (VLAN) identifier, a multicast packet with any MAC address and with a single VLAN identifier, a multicast packet with any MAC address and with any VLAN identifier, a multicast packet with a single MAC address and without a VLAN identifier, a multicast packet with a single MAC address and with a single VLAN identifier, or a multicast packet with a single MAC address and with any VLAN identifier.

4. The method of claim 1, wherein the first function comprises:

a first field specifying an identifier for the logical port;
a second field specifying the first registration type parameter; and
a third field specifying a virtual local area network (VLAN) identifier.

5. The method of claim 1, wherein the second function comprises:

a first field specifying an identifier for the logical port;
a second field specifying the second registration type parameter;
a third field specifying a media access control (MAC) address; and
a fourth field specifying a virtual local area network (VLAN) identifier.

6. The method of claim 1, further comprising:
- providing a third function operable to de-register the logical port of the Ethernet adapter as a recipient of any broadcast packet received by the Ethernet adapter satisfying a third predefined criterion;
- providing a fourth function operable to de-register the logical port of the Ethernet adapter as a recipient of any multicast packet received by the Ethernet adapter satisfying a fourth predefined criterion; and
- invoking the third function and the fourth function by the application assigned to the logical port.

7. The method of claim 6, wherein the third predefined criterion matches the first predefined criterion and the fourth predefined criterion matches the second predefined criterion.

8. A system comprising:
- an Ethernet adapter shared by a plurality of applications executing on a plurality of virtual systems, the Ethernet adapter including a plurality of logical ports;
- a hypervisor in communication with the Ethernet adapter and the plurality of applications, the hypervisor including a first function operable to register a logical port of the Ethernet adapter as a recipient of any broadcast packet received by the Ethernet adapter satisfying a first predefined criterion, including a broadcast packet with or without a virtual local area network (VLAN) identifier, and a second function operable to register the logical port of the Ethernet adapter as a recipient of any multicast packet received by the Ethernet adapter satisfying a second predefined criterion, including a multicast packet with a media access control (MAC) address and with or without a VLAN identifier; and
- an application assigned to the logical port to invoke the first function, including providing to the hypervisor a first registration type, a port number and a VLAN identifier parameters, wherein the first registration type parameter indicates the broadcast packet with or without a VLAN identifier, the VLAN identifier parameter identifies a VLAN whose broadcast traffic is a receive candidate, and the port number parameter identifies a logical port within the Ethernet adapter, and wherein invoking the first function results in registration of only the logical port assigned to the application invoking the first function as a recipient of any broadcast packet received by the Ethernet adapter satisfying the first predefined criterion, and invoke the second function, including providing to the hypervisor a second registration type, a port number, a MAC address and a VLAN identifier parameters, wherein the second registration type parameter indicates the multicast packet with or without a VLAN identifier, the VLAN identifier parameter identifies a VLAN whose multicast traffic is a receive candidate, the port number parameter identifies a logical port within the Ethernet adapter, and the multicast MAC address parameter specifies a destination multicast address, and wherein invoking the second function results in registration of only the logical port assigned to the application invoking the second function as a recipient of any multicast packet received by the Ethernet adapter satisfying the second predefined criterion.

9. The system of claim 8, wherein the first predefined criterion is a broadcast packet without a virtual local area network (VLAN) identifier, a broadcast packet with a single VLAN identifier, or a broadcast packet with any VLAN identifier.

10. The system of claim 8, wherein the second predefined criterion is a multicast packet with any media access control (MAC) address and without a virtual local area network (VLAN) identifier, a multicast packet with any MAC address and with a single VLAN identifier, a multicast packet with any MAC address and with any VLAN identifier, a multicast packet with a single MAC address and without a VLAN identifier, a multicast packet with a single MAC address and with a single VLAN identifier, or a multicast packet with a single MAC address and with any VLAN identifier.

11. The system of claim 8, wherein the first function comprises:
- a first field specifying an identifier for the logical port;
- a second field specifying the first registration type parameter; and
- a third field specifying a virtual local area network (VLAN) identifier.

12. The system of claim 8, wherein the second function comprises:
- a first field specifying an identifier for the logical port;
- a second field specifying the second registration type parameter;
- a third field specifying a media access control (MAC) address; and
- a fourth field specifying a virtual local area network (VLAN) identifier.

13. The system of claim 8, wherein:
- the hypervisor further includes a third function operable to de-register the logical port of the Ethernet adapter as a recipient of any broadcast packet received by the Ethernet adapter satisfying a third predefined criterion, and a fourth function operable to de-register the logical port of the Ethernet adapter as a recipient of any multicast packet received by the Ethernet adapter satisfying a fourth predefined criterion; and
- wherein the application assigned to the logical port invokes the third function and the forth function.

14. The system of claim 13, wherein the third predefined criterion matches the first predefined criterion and the fourth predefined criterion matches the second predefined criterion.

15. A computer program product comprising a non-transitory computer readable storage medium, the non-transitory computer readable storage medium including a computer readable program for managing broadcast packets or multicast packets received by an Ethernet adapter comprising a plurality of logical ports, wherein the Ethernet adapter is shared by a plurality of applications executing on a plurality of virtual systems, and wherein the computer readable program when executed on a computer causes the computer to:
- provide a first function operable to register a logical port of the Ethernet adapter as a recipient of any broadcast packet received by the Ethernet adapter satisfying a first predefined criterion, including a broadcast packet with or without a virtual local area network (VLAN) identifier;
- provide a second function operable to register the logical port of the Ethernet adapter as a recipient of any multicast packet received by the Ethernet adapter satisfying a second predefined criterion, including a multicast packet with a media access control (MAC) address and with or without a VLAN identifier;
- invoke the first function by an application assigned to the logical port, including providing a first registration type, a port number and a VLAN identifier parameters by the application, wherein the first registration type parameter indicates the broadcast packet with or without a VLAN identifier, the VLAN identifier parameter identifies a VLAN whose broadcast traffic is a receive candidate, and the port number parameter identifies a logical port within the Ethernet adapter, and wherein invoking the first function results in registration of only the logical port assigned to the application invoking the first function as a recipient of any broadcast packet received by the Ethernet adapter satisfying the first predefined criterion; and invoke the second function by the application assigned to the logical port, including providing a second registration type, a port number, a MAC address and a VLAN identifier parameters by the application, wherein the second registration type parameter indicates the multicast packet with or without a VLAN identifier, the VLAN identifier parameter identifies a VLAN whose multicast traffic is a receive candidate, the port number parameter identifies a logical port within the Ethernet adapter, and the multicast MAC address parameter specifies a destination multicast address, and wherein invoking the second function results in registration of only the logical port assigned to the application invoking the second function as a recipient of any multicast packet received by the Ethernet adapter satisfying the second predefined criterion.

16. The computer program product of claim 15, wherein the first predefined criterion is a broadcast packet without a virtual local area network (VLAN) identifier, a broadcast packet with a single VLAN identifier, or a broadcast packet with any VLAN identifier.

17. The computer program product of claim 15, wherein the second predefined criterion is a multicast packet with any media access control (MAC) address and without a virtual local area network (VLAN) identifier, a multicast packet with any MAC address and with a single VLAN identifier, a multicast packet with any MAC address and with any VLAN identifier, a multicast packet with a single MAC address and without a VLAN identifier, a multicast packet with a single MAC address and with a single VLAN identifier, or a multicast packet with a single MAC address and with any VLAN identifier.

18. The computer program product of claim 15, wherein the first function comprises:
    a first field specifying an identifier for the logical port;
    a second field specifying the first registration type parameter; and
    a third field specifying a virtual local area network (VLAN) identifier.

19. The computer program product of claim 15, wherein the second function comprises:
    a first field specifying an identifier for the logical port;
    a second field specifying the second registration type parameter;
    a third field specifying a media access control (MAC) address; and
    a fourth field specifying a virtual local area network (VLAN) identifier.

20. The computer program product of claim 15, wherein the computer readable program when executed on the computer further causes the computer to:
    provide a third function operable to de-register the logical port of the Ethernet adapter as a recipient of any broadcast packet received by the Ethernet adapter satisfying a third predefined criterion;
    provide a fourth function operable to de-register the logical port of the Ethernet adapter as a recipient of any multicast packet received by the Ethernet adapter satisfying a fourth predefined criterion; and
    invoke the third function and the fourth function by the application assigned to the logical port.

\* \* \* \* \*